United States Patent [19]

Bonnet et al.

[11] Patent Number: 4,852,081

[45] Date of Patent: Jul. 25, 1989

[54] ECHO SUPPRESSOR WITH ADAPTIVE DIGITAL FILTER FOR TRANSMISSION SYSTEM

[75] Inventors: Radelani A. Bonnet, Paris; Odile M. Macchi, Orsay, both of France

[73] Assignee: Centre National de la Recherche Scientifique, Paris, France

[21] Appl. No.: 83,937

[22] PCT Filed: May 25, 1984

[86] PCT No.: PCT/FR84/00140

§ 371 Date: Jan. 28, 1985

§ 102(e) Date: Jan. 28, 1985

[87] PCT Pub. No.: WO84/04858

PCT Pub. Date: Dec. 6, 1984

Related U.S. Application Data

[63] Continuation of Ser. No. 703,228, Jan. 28, 1985, abandoned.

[30] Foreign Application Priority Data

May 26, 1983 [FR] France .............................. 83 08713

[51] Int. Cl.$^4$ ........................................... H04B 3/23
[52] U.S. Cl. ..................... 370/32.1; 379/410
[58] Field of Search ........................ 379/406, 410, 411; 370/32, 32.1

[56] References Cited

U.S. PATENT DOCUMENTS

| | | | |
|---|---|---|---|
| 4,334,128 | 6/1982 | Snijders | 179/170.2 |
| 4,355,214 | 10/1982 | Léry et al. | 370/32 |
| 4,370,741 | 1/1983 | Haass | 370/24 |
| 4,558,187 | 12/1985 | Billi et al. | 179/170.2 |
| 4,682,358 | 7/1987 | Werner | 379/411 |

FOREIGN PATENT DOCUMENTS

| | | | |
|---|---|---|---|
| 0036696 | 9/1981 | European Pat. Off. | 370/32.1 |
| 0073869 | 3/1983 | European Pat. Off. | |
| 2029175 | 3/1980 | United Kingdom | 370/32.1 |

OTHER PUBLICATIONS

"A New Digital Echo Canceler for Two-Wire Full-Duplex Data Transmission", K. Mueller, IEEE Transactions on Communications, vol. Com-24, No. 9, Sep. 1976, pp. 956-962.

"A Passband Data-Driven Echo Canceller for Full-Duplex Transmission on Two-wire Circuits", Weinstein, IEEE Transactions on Communications, vol. Com-25, No. 7, Jul. 1977 pp. 654-666.

"Echo Cancelling System Based on the Sign Correlation Algorithm", Jorgensen et al., National Telecommunications Conference, Nov. 29 through Dec. 3, 1981, New Orleans, Louisiana, vol. 2, NTC Record 1981-IEEE C7.5.1-C7.5.6.

*Primary Examiner*—Jin F. Ng
*Assistant Examiner*—Randall S. Vaas
*Attorney, Agent, or Firm*—Larson and Taylor

[57] ABSTRACT

An adaptive echo suppressor is provided at each local station in a data transmission system for transmission of local data from a local station to a remote station over a transmission medium exhibiting an echo and simultaneous transmission of far end data over said medium from said remote station. The echo suppressor comprises an adaptive echo suppressor located at said local station and comprising: an adaptive digital filter connected to receive the local data $a_x$ and a clean signal $e_k$ substantially free of echo and arranged to deliver on an output an estimation $o_k$ of the echo of the local data by multiplying a vector of coefficients $C_k$ with the local data $a_k$, said vector having an adaptation algorithm:

$$C_{k+1} = C_k + \mu a_k^* \cdot f(e_k)$$

wherein $\mu$ is a predetermined incrementation step, $a_k^*$ is a conjugated value of the local data $a_k$, and f is a predetermined function of $e_k$ and substractor means having an input connected to receive said far end data signal from said transmission medium, said far end data signal including said far end data and the echo of the local data and a subtractive input connected to receive said estimation $o_k$ from said digital filter. The digital filter is rendered only responsive to that vectorial component of $e_k$ which is orthogonal to the remote data signal.

9 Claims, 6 Drawing Sheets

Fig. 10

FIG. 8.
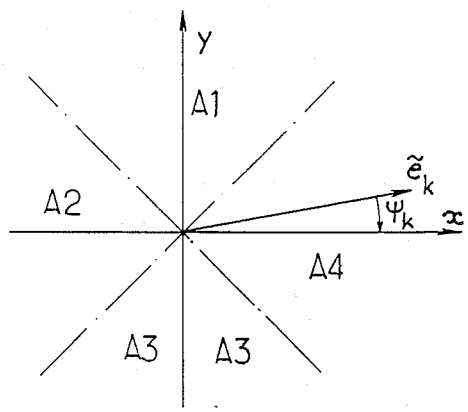
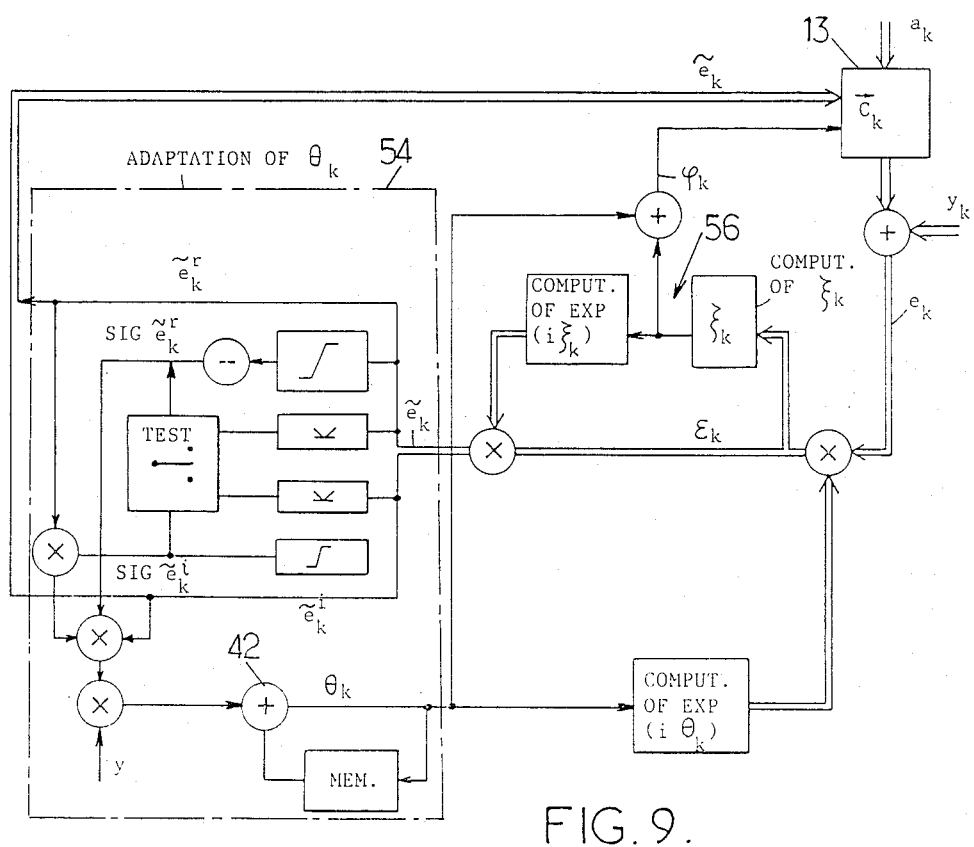
FIG. 9.

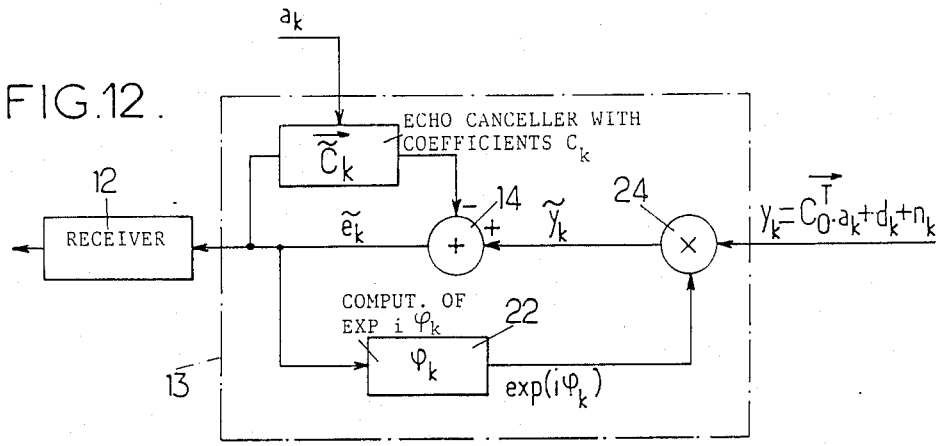
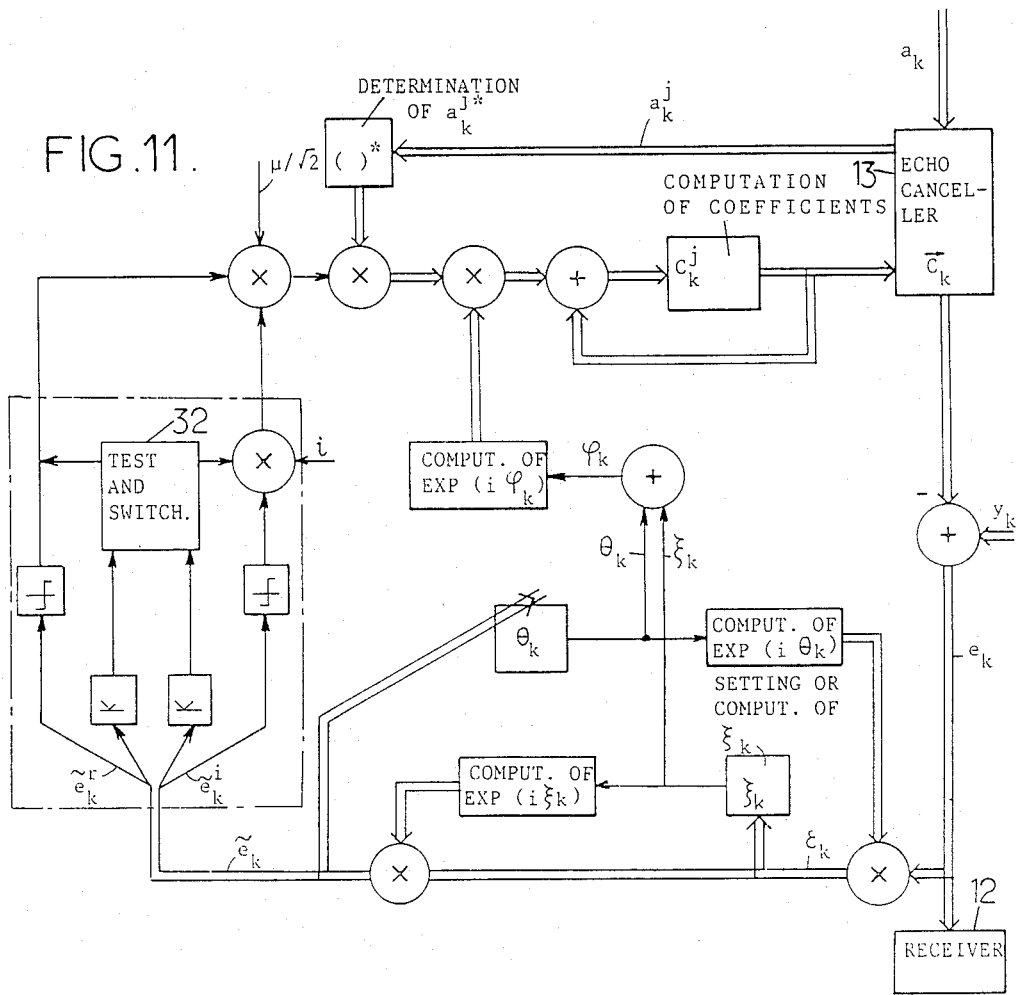

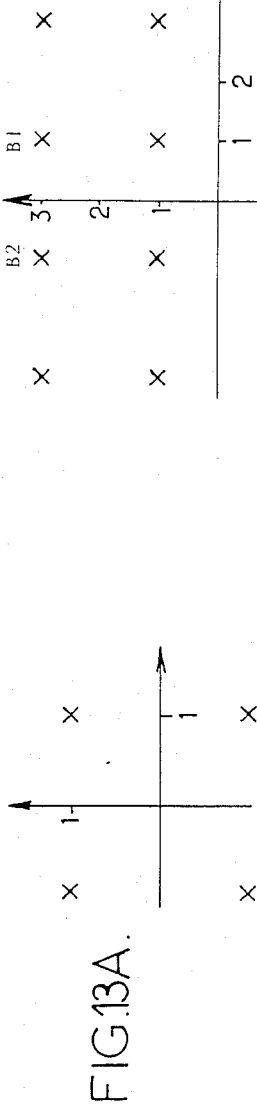
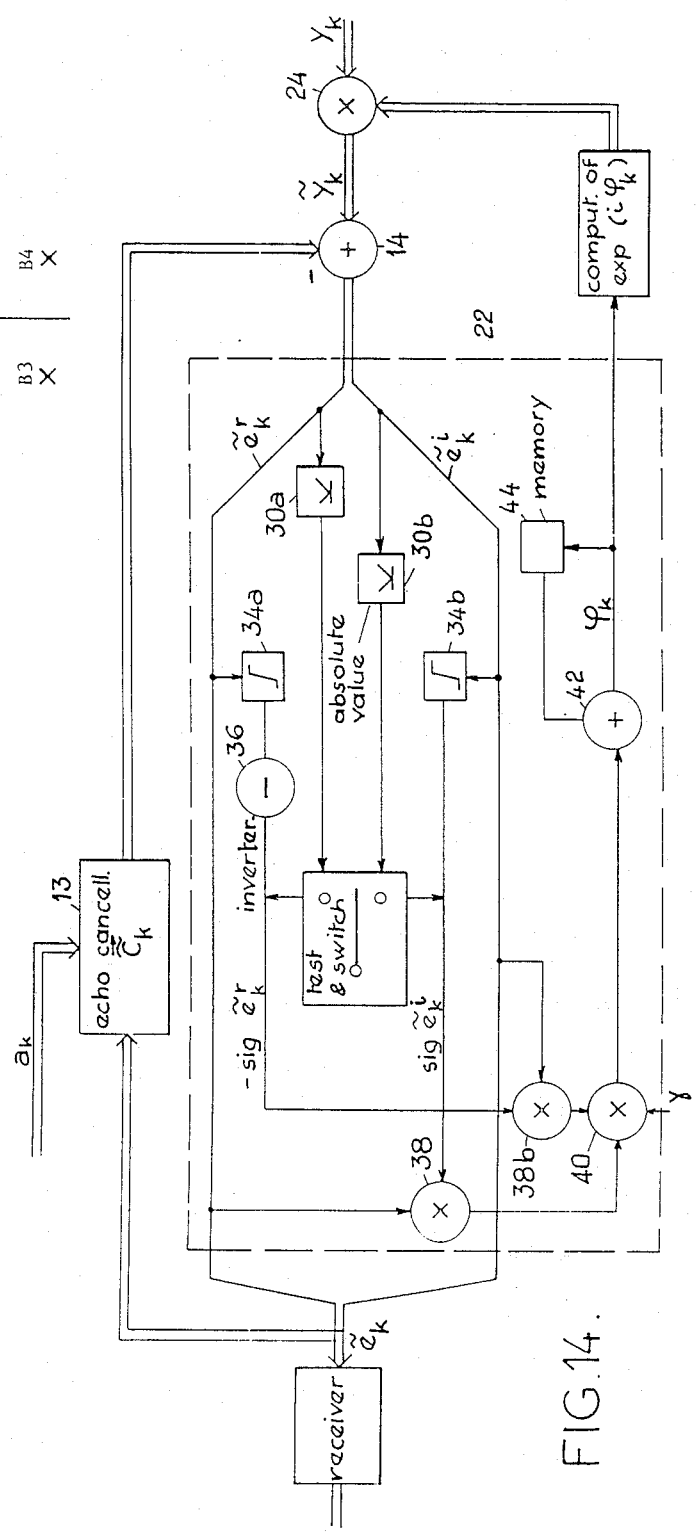

ECHO SUPPRESSOR WITH ADAPTIVE DIGITAL FILTER FOR TRANSMISSION SYSTEM

This application is a continuation of application Ser. No. 703,228 filed Jan. 28, 1985, now abandoned.

BACKGROUND OF THE INVENTION

1. Technical Field

The invention covers simultaneous bidirectional (duplex) data transmission field, and especially QAM or phase modulation, over a same media. The specific subject is an echo suppressor for such a system, of the type including an adaptive digital filter designed to provide an estimate of $\sigma_k$ (the effective echo) and whose adaptation algorithm of vector $\vec{C}$ of coefficients has the form:

$$\vec{C}_{k+1} = \vec{C}_k + \mu \vec{a}_k^* \cdot f(e_k)$$

wherein $\mu$ and f are a determined incrementation step and a predetermined function;

2. Description of the Prior Art

Before presenting the state of the prior art and the contribution of the invention, it may be useful to recall some information related to data bidirectional transmission over a same medium and the relevant problems.

FIG. 1 shows the schematic diagram of a simultaneous bidirectional transmission system between two remote terminals A and B, over a same transmission medium 10 that may be for example a two-wire telephone line. The information to be transmitted consists of a sequence of symbols, generally quantified, that may represent data signals as well as speech signals, when useful signals a and d coming from terminals A and B are transmitted within the same bandwidth, signal y received in receiver 12 of terminal A includes the useful signal d (remote data) generated by transmitter 11 of remote terminal B, lost however in additive noise:

$$y : d + n + \sigma' \qquad (1)$$

The noise is often of a higher level than useful signal d, it includes additive line noise n and the echo $\sigma'$ of signal a (local data) sent by terminal A, and this in spite of the presence of differential transformers 15 at both ends of the transmission media 10. This phenomenon is schematically illustrated in FIG. 1 where transmission from B to A is shown in solid lines, whereas transmission from A to B is shown in dashed lines. The preponderant part of this noise is generally echo $\sigma'$, which derives from local data through the unknown "echo filter" $\vec{C}_o$:

$$\sigma'_k = \vec{C}_o \cdot \vec{a}_k.$$

It is necessary to cancel, or at least attenuate the action of the echo which would prevent the recovery of signal d in receiver 12 of terminal A. Many echo suppression techniques have been proposed. The most common solution has been to insert at each station an adaptive digital filter 13, so-called "echo canceller", with a transfer function represented by a vector of coefficients $\vec{C}_k$, which from a sequence of successive symbols $a_k$ (k indicating the symbol sequential number) transmitted by source 11 in station A, sequence obviously available in station A, provides a linear estimation $$\sigma_k = \vec{C}_k \cdot \vec{a}_k \qquad (2).$$

The estimation is called recovered echo or estimation of true echo $\sigma'$. This recovered echo is sent to substractor 14 that receives also the signal y sent to station A through line 10. The difference $e_k$ between the two signals $$e_k = y_k - \sigma_k \qquad (3)$$

is applied to receiver 12.

The power of echo $\sigma_k'$, is much variable, as well as the power of useful signal $d_k$.

The data used is, as a rule, complex (case of phase modulation and modulation with two carriers in quadrature. In this case the adaptation algorithm used typically has the following form:

$$\vec{C}_{k+1} = \vec{C}_k + \mu \vec{a}_k^* \cdot f(e_k) \qquad (4)$$

wherein $\mu$ and f are respectively an incrementation step and a predetermined function.

This formula assumes, as a representation of residual echo $er_k$, the "clean" signal $$e_k = tr_k + d_k + n_k$$

wherein $er_k = (\vec{C}_o - \vec{C}_k) \cdot \vec{a}_k$.

Most of the time, when the echo does not exhibit a significant phase shift, the function f adopted is the gradient of the quadratic error, so that the algorithm (4) becomes:

$$\vec{C}_{k+1} = \vec{C}_k + \mu (y_k - \sigma_k) \vec{a}_k^* \qquad (5).$$

The shortcoming of the above solution is to require a complex filter, with a great number of bits for each coefficient—namely about twenty—and heavy computation.

Therefore it has been envisioned to use the sign of $e_k = y_k - \sigma_k$ as a function, instead of the gradient itself, in order to simplify the implantation. But it is found that this algorithm cannot ensure a full convergence of the adaptation.

Actually this algorithm is written as:

$$\vec{C}_{k+1} = \vec{C}_k + \mu \vec{a}_k^* \cdot \text{sign } e_k \qquad (6)$$

wherein $$\text{sign}.(e_k) \triangleq 1/\sqrt{2}[\text{sign} e_k^r + i \text{ sign} e_k^i] \qquad (7)$$

$e_k^r$ and $e_k^i$ being respectively the real and imaginary components of $e_k$.

To obtain convergence, $e_k$ must have the same sign as the residual echo $er_k$. However, as soon as the adaptation is sufficient to have the level of $er_k$ lower than the remote data level $d_k$, the sign identity condition is not satisfied anymore and the echo residue convergence is interrupted (T.A.C.M; CLAASEN, W. F. G. MECKLENBRAUKER, "Comparison of the convergence of two algorithms for adaptive FIR digital filters", TEEE Trans. ASSP, Vol. 29, No. 3, June 1981, pp. 670-678).

This difficulty is shown in FIG. 2 where is illustrated the case with opposite signs of the real components of residual echo $er_k$ and of the difference $e_k$ between the recovered echo $\sigma_k$ and the received signal $d_k$.

Other solutions have been used to solve this problem. For example it has been proposed to insert a forced noise signal $b_k$, with a kown level close to the level of remote data $d_k$, in order to compensate for the presence of the data (FIG. 1). However, this adjunction significantly increases the system complexity (N. HOLTE, S. STUEFLOTTEN, "A new digital echo canceler for two-wire subscriber lines"; IEEE Trans. on Communications, Vol. COM-29, No. 11, Nov. 1981, pp. 1573–1581).

SUMMARY OF THE INVENTION

The object of the present invention is to provide an echo suppressor that has better performances than existing algorithms and significantly better than the conventional gradient algorithm. To accomplish the objective, the invention uses a completely different approach and starts from the observation that, when the remote data $d_k$ are along one of the axes (along the imaginary axis, in the case of FIG. 3), the component of the clean signal $e_k$ in quadrature with data $d_k$ (along the real axis in FIG. 3) is equal to the corresponding component of residual echo $er_k$: by using only this significant quadrature component of residual echo $er_k$, the convergence will be improved. And, accordingly, the invention proposes—when the data are not along the axes—to accomplish the adaptation of the algorithm by means of the only component of the clean signal that is in quadrature with the remote data $d_k$: it can be said that the projection principle is used.

The invention proposes accordingly an echo suppressor in conformity with claim 1.

The invention will be better understood upon reading the forthcoming description of a particular embodiment, given as a non limiting example. The description refers to the accompanying drawings.

BRIEF DESCRIPTION OF THE DRAWINGS

FIG. 8 is a graph showing the direction in which the phase compensation loop must rotate $\vec{e}_k$ to bring it back on one of the axes.

FIG. 9 illustrates the phase $\theta_k$ adaptation algorithm in the general case.

FIG. 11 shows the echo suppressor coefficients adaptation according to one of the operation modes of the invention.

FIG. 12, similar to a portion of FIG. 1, shows the principle of the echo suppressor phase compensation loop, for a graph with data on the diaganols.

FIGS. 13A and 13B are respectively four and sixteen points graphs with points on the diagonals, that is for which $\xi_k$ is equal to $\pi/4$.

FIG. 14 is a detailed diagram of the phase adaptation loop according to a particular embodiment illustrated in FIG. 12.

DETAILED DESCRIPTION OF PREFERRED EMBODIMENTS

In order that the invention may be compared with the previous state of the art, the structure and operation of the known echo suppressor using the gradient algorithm (5) will first be described.

Figure 1:
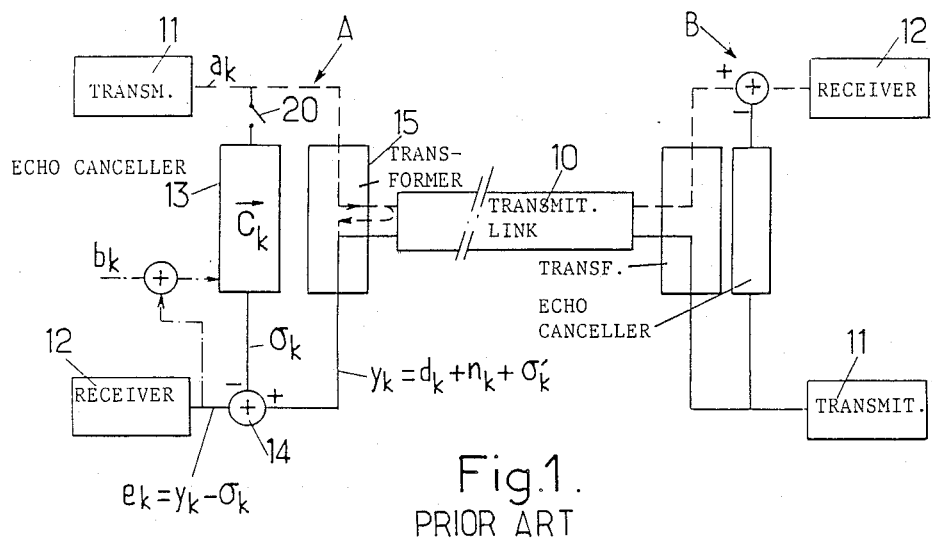
FIG. 1, already mentioned, is a schematic diagram of a data transmission system according to the prior state of the art, with terminals equipped with an echo suppressor.
Figure 2:
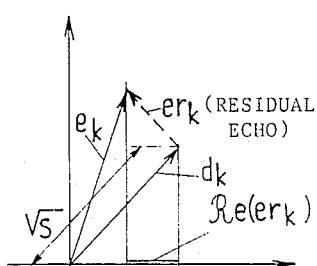
FIGS. 2 and 3 are interpretation geometrical diagrams, showing the residual echo er for a complex data (FIG. 2) and for a purely imaginary data (FIG. 3).

Referring to FIG. 1, the signal coming from transmitter 11 in station A is sampled by component 20 shown as a switch closed at intervals $\Delta$. Echo suppressor 13 includes a filter using N successive samples for providing an evaluation $\sigma_k$ of the echo from $K+L+1$ delay elements:

$$a_{k+k} = a[(k+K)\Delta]$$

$$\ldots$$

$$a_k = a[k\Delta]$$

$$\ldots$$

$$a_{k-L} = a[(k-L)\Delta]$$

The N samples are combined to generate a vector $\vec{a}_k$ that represents the signal applied to the digital filter at time $k\Delta$, just after supply of $a_K$ by transmitter 11. Estimated echo $\sigma_k$ is assessed by multiplying samples $k-L$ through $k+K$ by coefficients $h_{-k}$ through $h_L$, and performing the sum of the products. Vector $\vec{C}_k$ of N coefficients is generated by the adaptation algorithm (5). In the presentation of the invention, the case with the data on one axis will be presented first, then the case where the data are located anywhere.

CASE OF DATA ON ONE AXIS

The following notation is used:

$$\Delta C_k = a_k^* e_k \quad (8)$$

$$\Delta C_k^r = \tau ue\ (\Delta C_k), \Delta C_k^i = Jm\ (\Delta C_k)$$

A = power of near data $a_k$
B = Power of remote data $d_k$
R = power of residual echo $er_k$.

In order to simplify, the power of in-line noise $n_k$ is assumed to be negligible, a hypothesis that is often fulfilled and which in any event does not change the results.

On the other hand, it will be assumed that sequences $\{a_k\}$ and $\{d_k\}$ are representing centered random variables, taking discrete values with equal probabilities.

With above notations, it can be written that the clean signal $e_r$ at time k is:

$$e_k = (er_k^r d_k^r) + i(er_k^{ki} + d_k^i).$$

Figure 3:
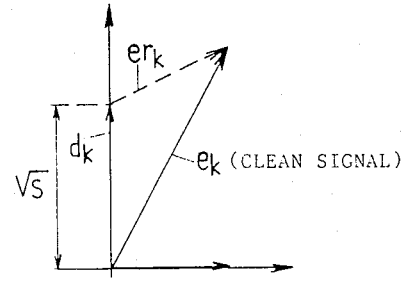

If the remote data are on the axis (FIG. 3), that is real or imaginary, one of their components is zero. If, for example, $d_k$ is imaginary, that is $d_k^r = 0$, the real part of $e_k$ is equal to the real part of echo residue $er_k$, except for the line noise, and the increment of the gradient algorithm (5) becomes, from formula (8):

$$\begin{cases} \Delta C_k^r = a_k^r e_k^r + a_k^i e_k^i \\ \Delta C_k^i = a_k^r e_k^i - a_k^i e_k^r \end{cases} \quad (9)$$

or else, since $d_k^r = 0$:

$$\begin{cases} \Delta C_k^r = a_k^r er_k^r + a_k^i (er_k^i + d_k^i) \\ \Delta C_k^i = a_k^r (er_k^i + d_k^i) - a_k^i er_k^r \end{cases}$$

The formula is similar when $d_k$ is real.

In the forthcoming comparison, the gradient algorithm (9) will be called ONAX when the remote data is on one of the axes.

This algorithm ONAX can be transformed according to the projection principle, into a simplified algorithm SIGNID by using only the significant data contained in $(e_k)$: it is sufficient to delete in formulas (8) and (9) the portion of the increment affected by $d_k$, that shows as a noise. In the case where $d_k^r = 0$, formula (9 bis) is obtained where the remote data do not appear anymore.

$$\begin{cases} \Delta C_k^r = a_k^r er_k^r \\ \Delta C_k^i = -a_k^i er_k^r \end{cases} \quad (9\text{bis})$$

In complex form, those formulas expressing algorithm SIGNID can be written:

$$\text{SIGNID } \vec{C}_{k+1} = \vec{C}_k + \mu \, \vec{a}_k^* \begin{cases} i e_k^i, \text{ if } d_k^i = 0 \\ e_k^r, \text{ if } d_k^c = 0 \end{cases}$$

One of the objects is to reduce the complexity of the algorithms; this simplification can be accomplished by considering only the sign of the significant applicable component. Algorithms ONAX and SIGNID respectively generate algorithms that will be respectively called SURAX and SIGNIF it will be shown how those two latter algorithms by using the "sign" function eliminate the shortcomings of the forementioned sign SI algorithms—given by formula (6)—and SI'—applicable to the addition of forced noise.

CASE OF DATA NOT ON AXES

If the remote data $d_k$ is not on an axis, it is, according to the invention, brought back on the axis by a rotation $\phi_k$ (in order to remain in a fixed reference frame). Thus:

$$\vec{d}_k = d_k \exp(i\phi_k)$$

wherein $\vec{d}_k$ has one null component (real or imaginary). This rotation transforms the gradient algorithm increment into:

$$\widetilde{\Delta C_k} = \Delta C_k \exp(i\phi_k) = a_k^* \, \vec{e}_k$$

-continued $$\vec{e}_k = e_k \exp(i\phi_k) = \widetilde{er}_k + \widetilde{n}_k + \vec{d}_k$$

wherein $\widetilde{e}_k^r$ and $\widetilde{n}_k$ being respectively the result by rotation $\phi_k$ of: $er_k$ and $n_k$.

If, for example, data $d_k$ has been brought back on imaginary axis $\vec{oy}$ by rotation, whereby $\vec{d}_k^r = 0$, the following formula is obtained:

$$\vec{e}_k = (\widetilde{er}_k^r + i\widetilde{er}_k^i) + i\vec{d}_k^i + (\widetilde{n}_k^r + i\widetilde{n}_k^i).$$

The projection principle application yields the following increment:

$$\Delta'(C_k \exp i\phi) = a_k^r (\widetilde{er}_k^r + \widetilde{n}_k^r) - i a_k^i (\widetilde{er}_k^r + \widetilde{n}_k^r)$$

with data $\vec{d}_k$ rotated to $\vec{Ox}$ axis, that is such that $d_k^i = U$, the result would be:

$$\Delta'(C_k \exp i\phi) = a_k^* \, \widetilde{e}_k^i$$
$$: a_k^i (\widetilde{er}_k^i + \widetilde{n}_k^i) + i a_k^r (\widetilde{er}_k^i + \widetilde{n}_k^i)$$

The resulting algorithm is now written $$C_{k+1} \exp(i\phi_k) = C_k \exp(i\phi_k) + \mu a_k^* \begin{cases} (\widetilde{e}_k)^r & \text{si} \quad \vec{d}_k^r = 0 \\ i(e_k)^i & \text{si} \quad \vec{d}_k^i = 0 \end{cases} \text{GEN}$$

The manner that the data can be brought on one axis will be described later with reference to FIG. 7. The performances of the various algorithms and in particular the power of residual echo er may be computed and compared. This comparison was performed between residues $R_E$; $R_{SI}$; $R_{SI'}$; $R_{ON}$; $R_{SD}$; $R_{GEN}$; $R_{SU}$; $R_{SIG}$ for the algorithms:

E = gradient, according to formula (5)
SI = sign, according to formula (6)
SI' = sign with insertion of forced noise
ONAX = gradient, with data along one axis according to formula (9 bis)
SIGNID = ONAX considering the significant component only
GEN = data previously brought back along one axis, then using the significant component
SURAX = sign of SI, in the particular case where the data are along one axis
SIGNIF = SURAX, considering the significant component only.

In the representative case of a Gaussian residue, and without line noise, the residues are given in the following table:

TABLE I

| Algorithm | Gaussian residue | |
|---|---|---|
| (E) and (ONAX) | $R_E = \mu \dfrac{NAS}{2}$ | (10) |
| (SI) | $P_{SI} = \mu^2 \dfrac{\pi}{8} N^2 A^2 e^{S/RS}$ | (11) |
| (SI') | $R_{SI'} = \mu \dfrac{\sqrt{\pi}}{2\sqrt{2}} NA \sqrt{S} \, e^{\frac{1}{2}}$ | (12) |
| (SURAX) | $R_{SU} = \mu^2 \dfrac{\pi}{2} \dfrac{N^2 A^2}{2[1 + e^{-S/2R_{SU}}]^2}$ | (13) |

TABLE I-continued

| Algorithm | Gaussian residue | |
|---|---|---|
| (SIGNIF) | $R_{SIG} = \mu^2 \frac{\pi}{8} N^2 A^2$ | (14) |

It may be observed that in addition algorithms SIGNID and GEN have a null limit residue. Actually, for those two algorithms, the residue value, with line noise is:

$R\ SIGNID = R GEN = \mu NAB/(2-\mu Na)$.

The remote data power has no effect. This result is a great advantage. It is maintained for all algorithms using the projection principle: the adaptation is accomplished by using the "clean" signal component that is orthogonal to the remote data, and only the remote data.

In both following comparisons, only simplified forms of SURAX and SIGNIF have been taken into account in order to simplify, not ONAX, SIGNID and GEN.

Table I shows that algorithms SURAX and SIGNIF have performances superior to the sign SI conventional algorithm and that $R_{SIG}$ does not depend on power S of remote data; At last, regardless of R and $\mu$, $R_{SIG}$ is smaller than $R_{SU}$ for S/R>2, which is applicable to acceptable performances, the gain of SIGNIF in relation to SURAX is of 3 to 6 dB.

The advantage of SIGNIF versus 5 is much greater. With a Gaussian residue, the ration $R_S/R_{SIG}$ is exp (S/R$_{SI}$) with no noise. The ratio is close to 7 to the value previously considered, S/R=2, and rapidly rises with S/R, that is when echo suppression is improving.

It can be seen from equations (10) and (13) that parameter $\mu$ used in SIGNIF is not as small as necessary in algorithm SI. Actually $\mu$ is multiplied by the factor exp (S/2R) by using SIGNIF, whereas the same echo residue is obtained.

versely for SIGNIF, the decrement as a function of $\mu^2$ continues and a forced noise becomes unnecessary. If it is recalled that for algorithm (E) the decrement is as $\mu$, it is found a great advantage of SIGNIF versus E, a higher value of $\mu$, accelerating the convergence.

Furthermore, a comparison of formulas (10) and (14) shows that, for S>$\mu NA\pi/4$, which is a hypothesis that is practically always verified, we have $R_E \geq R_{SIG}$: in other words, SIGNIF algorithm has better performances than E when $\mu$ is small, that is has the value that must be selected at the end of convergence, when R/S is small.

Moreover, in evaluating the complexity of computation by E and SIGNIF algorithms in finite precision, as we are going to do it herein, it is noted that the drawback of having $\mu_{SIG} < \mu_E$ for higher values of −R/S is only apparent since the word lengths required for the echo suppressor coefficients are smaller for the SIGNIF algorithm.

The minimum number of bits b necessary to represent a component of the echo suppressor filter 13, depends on the searched residual echo R and the algorithm used. The computation indicates that the smallest b providing convergence fulfills the condition:

$$\begin{cases} 2^{-b} = \mu \sqrt{\frac{4}{2}} & \text{for } SURAX,\ si \\ 2^{-b} = \mu \frac{\sqrt{A}}{2} & \text{for } SIGNIF \\ 2^{-b} = \mu \sqrt{A}\ \sqrt{R+5} & \text{for } E \end{cases} \quad (15)$$

Starting from the hypothesis that $er_k$ is a Gaussian variable, the smallest bit weight expression can be derived from (15) by replacing $\mu$ by the value that it must have to get the same echo residue er. The result is the following table when B is supposed to be null:

TABLE II

| Algorithm | $\mu$ at predetermined er | Least significant bit to guarantee the convergence :b |
|---|---|---|
| (E) | $\mu_E = \dfrac{2R}{NA(S)}$ | $2^{-bE} = \dfrac{2R\sqrt{R+S}}{N\sqrt{A}\ S}$ |
| (SI) | $\mu_{SI} = \dfrac{2\sqrt{2}\ Re^{-S/2R}}{NA\sqrt{\pi}\ \sqrt{R}}$ | $2^{-bSI} = \dfrac{2Re^{-S/2R}}{N\sqrt{A}\ \sqrt{\pi}\ \sqrt{R}}$ |
| (SI') | $\mu_{SI'} = \dfrac{2\sqrt{2}\ R}{NA\sqrt{e\pi}\ \sqrt{S}}$ | $2^{-bSI'} = \dfrac{2R}{N\sqrt{A}\ \sqrt{e\pi}\ \sqrt{S}}$ |
| (SURAX) | $\mu_{SU} = \dfrac{\sqrt{2}\ R[1+e^{-S/2R}]}{NA\sqrt{\pi}\ \sqrt{R}}$ | $2^{-bSU} = \dfrac{R[1+e^{-S/2R}]}{N\sqrt{A}\ \sqrt{\pi}\ \sqrt{R}}$ |
| (SIGNIF) | $\mu_{SIG} = \dfrac{2\sqrt{2}\ R}{NA\sqrt{\pi}\ \sqrt{R}}$ | $2^{-bSIG} = \dfrac{\sqrt{2}\ R}{N\sqrt{A}\ \sqrt{\pi}\ \sqrt{R}}$ |

Figure 4:
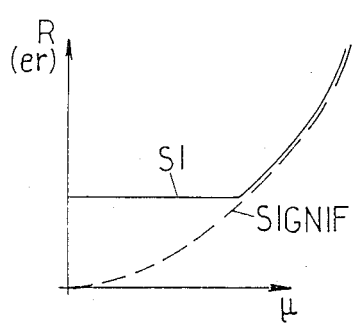
FIG. 4 is a diagram showing the noise reduction in the case of the sign algorithm (solid line SI curve) and in the case of the algorithm according to the invention (dashed line curve) versus the incrementation step $\mu$.

As indicated above, one of the advantages of SIGNIF is not to depend on remote data power S, so that there is no saturation of R at level S. This advantage is even more obvious if, not the Gaussian residus are considered, but the binary echo residues. For SI, residue $R_{SI}$ decreases as $\mu^2$ when R>S, but this decrement stops taking place for R=S, as shown in FIG. 4. Con- The comparison between SIGNIF and SURAX (for which the least significant bits are called $b_{SIG}$ and $b_{SU}$) in Table II above indicates that:

$$2^{b_{SIG}-b_{SU}} = \frac{1}{\sqrt{2}} \left[1 + \exp\left(-\frac{S}{2R}\right)\right]$$

This quantity is between −0.5 bit and +0.5 bit, but for a good echo suppression, implying R<<S, the algorithm SIGNIF contributes to a gain of 0.5 bit over SURAX. Computation taking the noise in consideration shows that it would be equivalent in the case of forced noise B=S.

Comparison between the results in Table II for algorithms SI and SIGNIF shows that:

$$2^{b_{SIG}-b_{SI}} = \sqrt{2} \cdot \exp\left(-\frac{S}{2R}\right)$$

Thus $b_{SIG}$ is less than $b_{SI}$ in all useful cases, and the difference is large if the system operates satisfactorily, that is if R/S is small. This point is very important since one of the drawbacks of (SI) versus (E) is the great accuracy required for the binary representation of the coefficients. It can be seen that (SIGNIF) eliminates the drawbacks of (SI).

Last, if binary lengths of E and SIGNIF are compared, we find:

$$2^{b_{SIG}-b_E} = [2\pi (R/S)(R/S + 1)]^{\frac{1}{2}} \quad (16)$$

$$\text{if } \frac{S}{B} < 2\pi - 1, \quad (17)$$

meaning that the SIGNIF binary length is greater than E's for all values of R/S; actually inequality (17) is not satisfied since the noise in E is the line noise, which is low. It may be concluded that $b_E > b_{SIG}$ as soon as:

$$\frac{R}{S} < \frac{A}{\pi} - \frac{1}{2} + \frac{1}{2}\sqrt{1 + \frac{2}{x}} \simeq -8,5 \text{ dB} \quad (18)$$

In actual cases, the desired residue level is always less than the level determined in (18) so that algorithm SIGNIF requires less bits than algorithm E proper. A more elaborate computation, taking the noise into account, indicates that the difference $$b_E - b_{SIG} \simeq \frac{1}{2} \log_2 \frac{S}{R} - \frac{1}{2} \log_2 4\pi, \quad (19)$$

for a medium quality of echo suppression, that is when both algorithms yield:

R≃B.

For a very high signal-to-noise ratio, that is R<<B, the difference is:

$$b_E - b_{SIG} \simeq \frac{1}{2} \log_2 \frac{S}{B} - \frac{1}{2} \log_2 2\pi, \quad (20)$$

From this point, it is possible to determine the saving in number of bits of SIGNIF as compared to E for predetermined S/N value:

S/N = S/R = 20 dB, $b_E - b_{si}$ = 1.5 bit

S/N = 30 dB, S/R = 40 dB, $b_E - b_{si}$ = 3.5 bit

Figure 5:
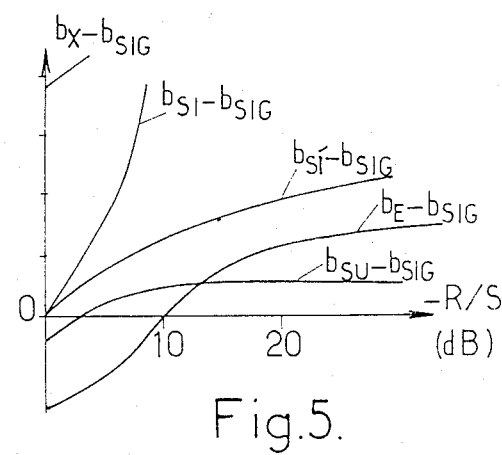
FIG. 5 is a diagram showing the representative graphs of the difference between the binary length of the coefficients with algorithm EE, SI, SI' and SURAX and with the SIGNIF algorithm for S/N=20 dB, versus −R/S.

FIG. 5 shows the binary word length saving accomplished with algorithm SIGNIF versus algorithms SI, SURAX, SI' and E. The saving is shown in relation to R/S (quality of echo suppression) for a line signal/noise ratio S/N of 20 dB.

Considering that, as for the conventional sign algorithm, SIGNIF uses sign ($e_k$) and not $e_k$ during coefficient adaptation process, this additional average reduction of 2 bits versus algorithm E, puts algorithm SIGNIF in better place among the possible echo adaptive suppression algorithms.

Computation steps (filtering by convolution $\vec{C}_k^T \cdot \vec{a}_k$ and adaptation) are also simpler for SIGNIF than for E. The computation complexity can be assessed according to the number of required single multiplications and additions: those figures depend on the algorithm as well as on the length of the used binary words.

The evaluation shows that for each component of two multiplications and a large number of additions are saved by substituting SIGNIF to SI.

A great number of multiplications and additions are saved by substituting SIGNIF for E.

The only obligation with SIGNIF is to detect a threshold on each step in order to determine which of data $d_k^r$ and $d_k^j$ is zero. However this operation must be performed anyway by the receiver with a decision device if it is not done in the echo suppressor. Therefore it is not a complication.

For a representative case with a N=16 taps filter, a power $S=10^{-1}$ of signal, ratio R/S=−18.5 dB, the computation savings, by using SIGNIF instead of E, are 36%. Moreover, this percentage hardly decreases when the signal magnitude $\sqrt{S}$ decreases. Actually for small values of S, the input analog/digital converter has to be more accurate. For example, if the input signal decreases down to S=−42 dBm, the converter requires 12 bits, and the saving is 35%.

Figure 6:
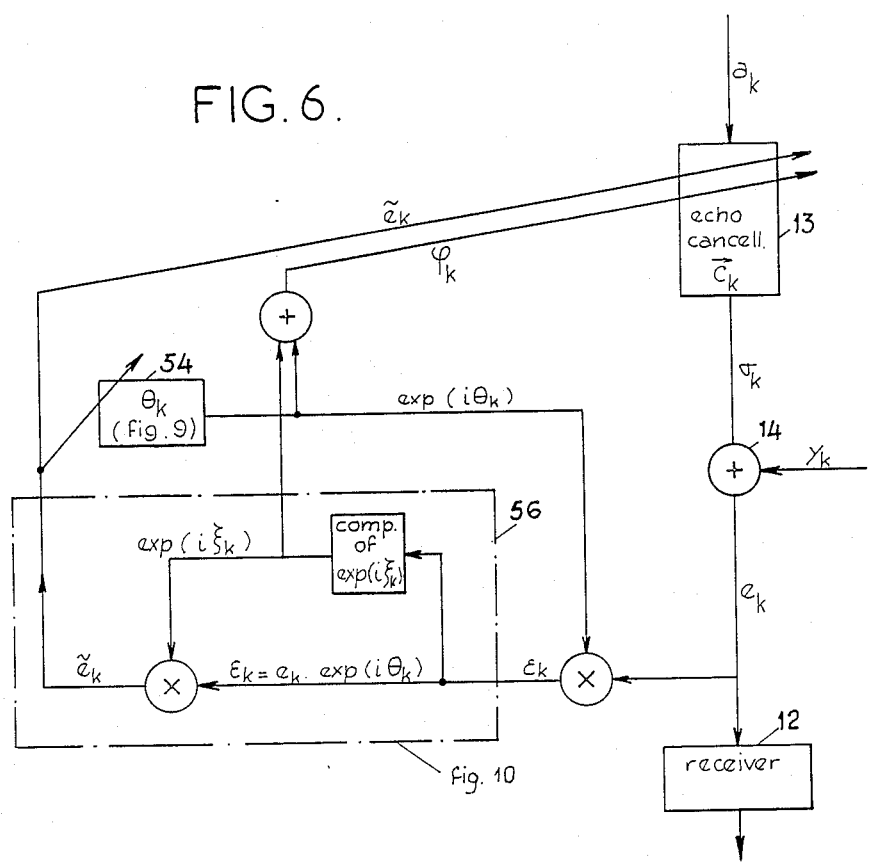
FIG. 6 shows the general implementation of the algorithm operating with the adaptation loop of phase $\theta_k$, the loop allowing for the determination of $\xi_k$ and the adaptation of the echo suppressor coefficients.
Figure 7:
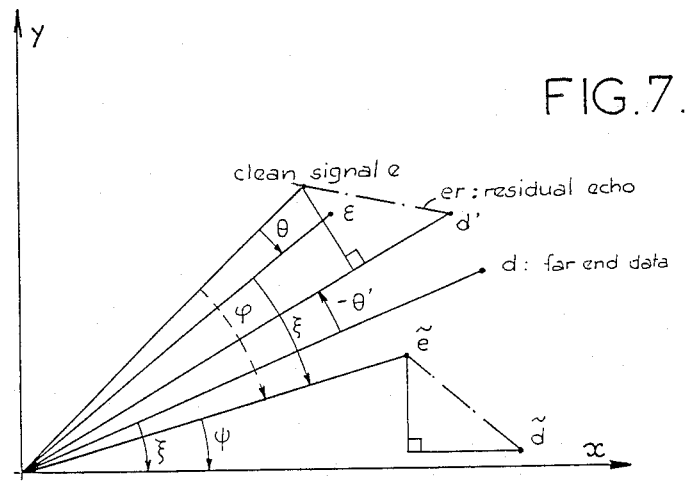
FIG. 7 is a graph showing how $\xi_k + \theta_k$ is selected.

Refering to FIGS. 6, 7 (where indexes are not marked for the sake of clarity) and 8, the way of performing the rotation to be carried out and an embodiment of an echo suppressor that includes means capable of using the projection principle implementing a phase follower algorithm that simultaneously works with GEN. The elements of FIG. 6 corresponding to those in FIG. 1 are designated with the same reference numbers.

Before describing the echo suppressor, its function and operating mode have to be determined. Phase correction $\phi_k$ to be performed may be broken down in two parts $$\phi_k = \theta_k + \xi_k \quad (20 \text{ bis}).$$

In this formula, $\theta_k$ is an analog parameter, corresponding to the phase shift (jitter, drift) contributed by the transmission line; angle $\theta_k$ varies slowly in relation to $\xi_k$, as will be observed hereunder. If $d_k$ is the transmitted or remote data, the phase shift caused by the line results for example into received data $d_k'$ contained in received signal $y_k$) being of the form $$d'_k = d_k \exp(-i\theta_k').$$

It is necessary to estimate $\theta_k$ from $\theta_k'$. It is the function of the phase adaptation algorithm that will thus perform synchronization of the carrier.

In this same (20 bis) formula, $\xi_k$ is a random discrete value, characteristic of transmitted data $d_k$; it can be defined as:

$$\xi_k = (\vec{Od_k}, \text{axis closest to } \vec{Od_k}).$$

Yielding $|\xi_k| \geq \pi/4$; when the two components of d have equal modulus, it is possible to arbitrarily select $\xi_k = \pi/4$ rather than $-\pi/4$: It will be so for points on the graph diagonals (all points for the 4 point graph of FIG. 13A, eight out of sixteen points in FIG. 13B).

The system will also have to evaluate $\xi_k$.

To do so, $\theta_k$ has to be evaluted (assuming that $\xi_k$ is found, that is the steady operation mode is established). The "clean" signal $e_k$ has been rotated by phase angle $\phi_k$ and has become $\tilde{e}_k$:

$$\tilde{e}_k = e_k \exp(i\phi_k).$$

This signal $\tilde{e}_k$ provides modified data $\tilde{d}_k$:

$$\tilde{d}_k = d_k \exp[i(\phi_k - \theta_k')] = d'_k \exp(i\phi_k)$$

Data $\tilde{d}_k$ will be located in the neighbourhood of one axis if angle $\phi_k$ has been judiciously selected. If the value of $\phi_k$ is not right (that is if $\theta$ is not the correct estimation of $\theta'$), even if the echo suppressor operates satisfactorily, $\tilde{d}_k$ will not be on an axis.

Signal $\tilde{e}_k$ is a representation of phase shift residue $(\phi_k - \xi_k - \theta_k')$, by angle:

$$\phi_k = (\vec{O\tilde{e}_k}, \text{axis closest to } \vec{O\tilde{e}_k}).$$

It is therefore possible to proceed with $\theta_k$ phase shifting by installing an adaptive algorithm operating as a first order digital phase-lock loop, that has to automatically track the proper value of $\theta_k$ by means of the error signal $\psi_k$ (shown in FIG. 7) through the following recurrence formula:

$$\theta_{k+1} = \theta_k + \gamma f_1(\psi_k) \tag{21}$$

wherein $\gamma$ is a positive adaptation parameter, and $f_1$ a suitably selected function.

The phase adaptation algorithm (21) may be written more accurately by considering the four zones A1–A4 bounded by the two bisectors. (FIG. 8). If, for example $\tilde{e}_k$ is in zone A4, the axis closest to axis $\vec{O\tilde{e}_k}$ is Ox, so that the data rotated $\tilde{d}_k$ has to be along axis Ox;

Angle $\psi$ is such that $$\tan \psi_k = -\tilde{e}_k^i/\tilde{e}_k^r \text{ for } \tilde{e}_k \in A4 \tag{22}$$

and modified data $d_k$ must be brought by rotation on Ox. With this rotation, the modulus of $\tilde{d}_k$ (or $\tilde{e}_k$) remains constant and the optimum value is obtained when the imaginary component $\tilde{d}_k^i$ (or $\tilde{e}_k^i$) is made maximum. Therefore, when $\tilde{e}_k$ is in A4 zone, variable $\theta_k$ can be set by the gradient algorithm. With notations of FIGS. 7 and 8, the algorithm can be written in the following general form:

$$\theta_{k+1} = \theta_k + \gamma \begin{cases} \tilde{e}_k^r \text{ signe }(\tilde{e}_k^i), \tilde{e}_k \in A1 \cup A3 \\ -\tilde{e}_k^i \text{ signe }(\tilde{e}_k^r), \tilde{e}_k \in A2 \cup A4. \end{cases} \tag{23}$$

For small values of error angle $\psi_k$, the first formula (23) may be written, using the value given by (22):

$$\phi_{k+1} = \phi_k + \gamma \psi_k |\tilde{e}_k^r|, \tilde{e}_k \in A1 \cup A3 \tag{24}$$

and since $e_k$ and $d_k$ are hardly different, by replacing $(d_k)$ by a mean value $\sqrt{S}$, algorithm (24) can be approximated as:

$$\phi_{k+1} = \phi_k + \gamma \sqrt{S} \psi_k \tag{25}.$$

Under the latter form, it can be observed that it is advantageous to give $\gamma$ a value inversely proportional to $\sqrt{S}$. When S can be evaluated, the parameter $\gamma$ may be initially set, otherwise, it may be given a larger value and an adaptation algorithm will be provided which gradually decreases it down to the optimum value.

Turning back to algorithm (23), it can be seen that it outlines how the imaginary component $\tilde{e}_k^i$ tends to be maximized (or minimized) when $\tilde{e}_k$ is located in zone A1 (or A3): for A2 and A4 the mechanism is similar.

It is interesting to note that, even without line generated interferences, the receiver has to synchronize the carriers, that is the demodulator phase with the useful signal phase: here, this task is automatically performed by algorithm $\theta_k$, that is substituted to an element of the receiver.

In other words, the function required from the echo suppressor, that consists in modifying data $d_k'$ in order to rotated them in the direction of axes, does not involve additional burden, as compared to usual echo suppression algorithms.

Once phase $\theta_k$ adaptation performed, the system is stabilized, and signal $\epsilon_k$ is obtained (FIGS. 6 and 7)

$$\epsilon_k = e_k \cdot \exp(i\theta_k)$$

or $$\epsilon_k = er_k \cdot \exp(i\theta_k) + S_k$$

with $$S_k = d_k \exp[i(\theta_k - \theta_k')].$$

The echo residue being small and shift $\theta_k'$ well compensated by $\theta_k$, signal $\epsilon_k$ enables to detect transmitted data $d_k$, that is to perform the evaluation of angle $\xi_k$.

FIG. 6 (using the same notations as FIG. 1) shows in a simplified presentation the general configuration of an adaptation echo suppressor of phase O operating according to this principle. It includes, in addition to the components shown in FIG. 1, a phase adaptation loop 54, and a loop 56 for generating $\xi_k$.

Phase $\theta_k$ adaptation loop 54 can have, in all cases, the general configuration illustrated in FIG. 9, with the same configuration as loop 22 in FIG. 14, which need therefore not to be described here. Loop 56 may have:

the configuration shown in FIGS. 10A or 10B in the case of 16 points graphs (FIG. 13B), the configuration shown in FIG. 11 in the case of SIGNIF algorithm application, by formula (26) that will be mentioned later.

Figures 10A, 10B:
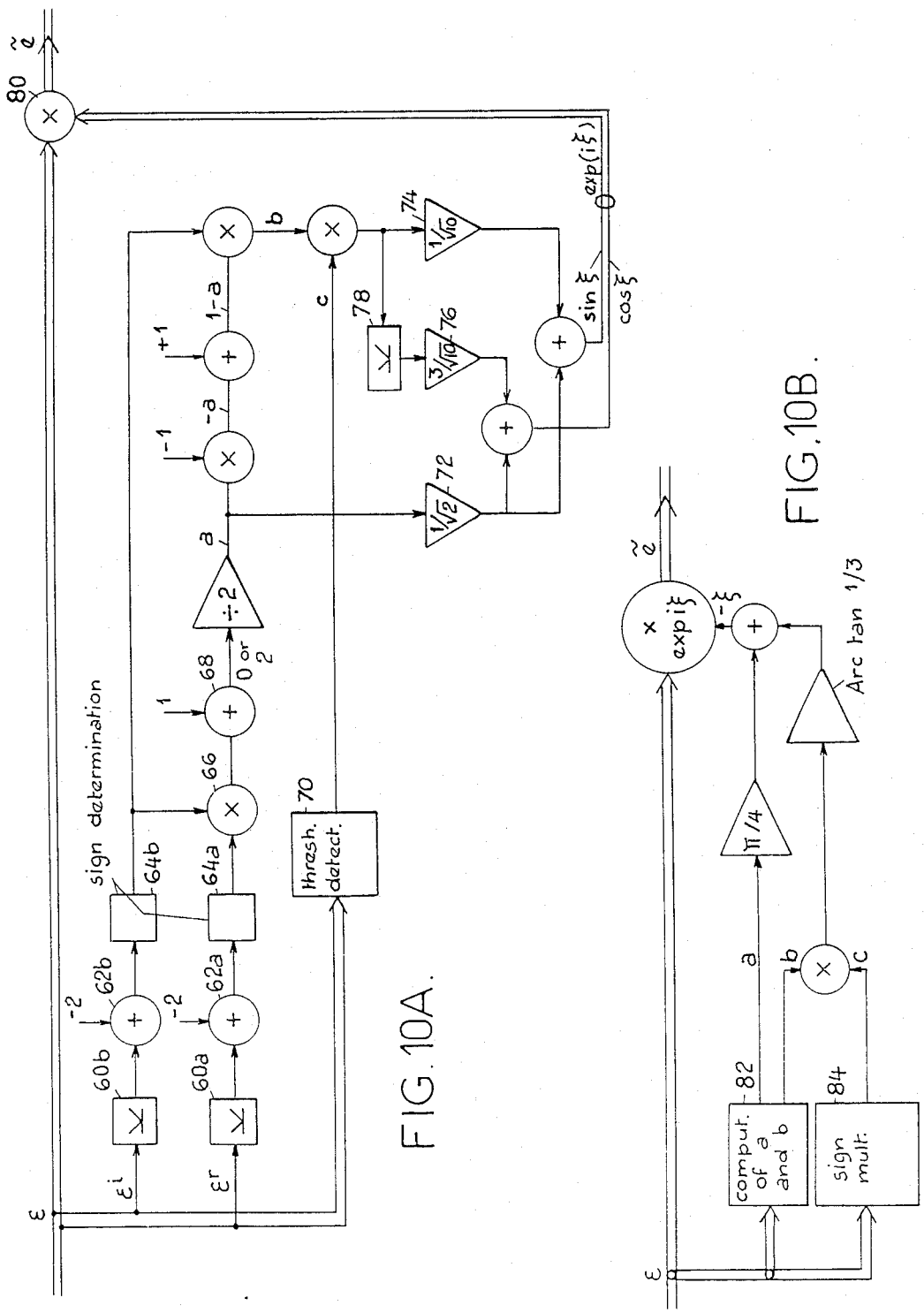
FIGS. 10A and 10B are two equivalent schematics reflecting the digital phase $\xi_k$ determination mode in the QAM 16 points diagram case.

FIG. 10A illustrates the components required to determine $\xi$ by application of formula $$\xi = a\frac{\pi}{4} + c\, b\, \text{Arc } tg\frac{1}{3}$$

where $a = \text{sign}/\epsilon^r - 2/.\text{sign}/\epsilon^i - 2/$ and b and c are as defined later applicable to the case taking into account the 16 points of FIG. 13B graph (used for transmission at 9600 bauds) with:

$$a = 0, \quad b = \pm 1$$
or $\quad a = 1, \quad b = 0$
and $\quad c = \pm 1$

The group of so determined cases is in agreement with all points of the graph. For example, for points on the diagonal, corresponding to:

$$[|d^1| > 2 \text{ et } |d^r| > 2]$$

or $$[|d^i| < 2 \text{ et } |d^r| < 2]$$

yielding:

$$\xi_k = \pi/4.$$

Conversely for points B1, B2, B3, B4:

$$[|d^i| > 2 \text{ et } |d^r| < 2]$$

and in this case:

$$\xi_k = \text{sig}(d^1).\text{sig}(d^r)\text{Arc}t\tfrac{1}{3}.$$

A similar result is found for the four remaining points.

The circuit in FIG. 10A provides adaptation for all points, hence rapid convergence. It includes two channels, one for $\epsilon^r$, the other for $\epsilon^i$ and including each a circuit 62a or 62b adding $-2$ to the output of 60a and 60b and a circuit 64a or 64b determining the sign. The sign product is performed in 66, in order to generate a and 1-a. In parallel, c is generated by threshold detector 70 with $\epsilon^r$ and $\epsilon^i$ as inputs.

In the case of the eight points on the diagonals, computation is performed in a single amplifier 72 with the following gain:

$$\frac{1}{\sqrt{2}} = \text{cosine } \frac{\pi}{4} = \sin \frac{\pi}{4}$$

For the other eight points, computation requires one amplifier 74 of gain $1/\sqrt{10}$, that is sine (Arc ta $\tfrac{1}{3}$), as well as an absolute value detector 78 and an amplifier 76 of gain $3/\sqrt{10}$, that is cosine (Arc ta $\tfrac{1}{3}$). Adders are used to generate sine $\xi$ and cosine $\xi$ which are inputs to the complex multiplier 80 that outputs $\overline{e} = \epsilon.\exp(i\xi)$.

FIG. 10B shows a more general block diagram: blocks 82 and 84 are respectively a circuit generating a and b, and a circuit performing the product of signs of $\epsilon^r$ and $\epsilon^i$, that is c.

Once the data is phase-shifted in the direction of the axes, in $\overline{e}_k$, algorithm GEN or any other algorithm using the same projection principle can be carried out as follows:

The component of $\overline{e}_k$ orthogonal to the closest axis is significant of the residual echo.

Only this component is used if, for example, algorithm SIGNIF is installed:

$$\vec{C}_{k+1} = \vec{C}_k + (\mu/\sqrt{2})\,\overline{a}_k * \begin{cases} i \; \text{sgn}(\overline{e}_k^i) & \text{if } |e_k^i| < |\overline{e}_k^r| \\ \text{sgn}(\overline{e}_k^r) & \text{if } |e_k^i| > |\overline{e}_k^r| \end{cases}$$

where $\vec{\overline{C}}_k = \vec{C}_k \exp(i_k \psi)$,

The result is vector $\vec{C}_k$ that tracks the echo path $\vec{C}_o$ by implementing algorithm:

$$\vec{C}_{k+1} = \vec{C}_k + e^{-i\psi k}(\mu/\sqrt{2})\overline{a}_k \begin{cases} i \; \text{sgn}\,\overline{e}_k^i & \text{if } |\overline{e}_k^i| < \\ & |\overline{e}_k^r| \\ \text{sgn}\,\overline{e}_k^r & \text{if } |e_k^i| > \\ & |\overline{e}_k^r| \end{cases} \quad (26)$$

FIG. 11 is a block diagram for algorithm (26) that does not have to be described in length, since its components are either conventional or described elsewhere in the present application.

Now, will be described, with reference to FIG. 12, the particular case when $\xi_k$ is constant and equal to $\pi/4$. That is for example, the case of a four-point graph (FIG. 13A) and a more general graph (such as in FIG. 13B if it is accepted to perform the echo suppressor coefficient adaptation only with the points located on the diagonals). The advantage of this solution is to be simple, but it slows down the convergence.

In this case, it is not necessary to split $\phi_k$ into two parts; it is the adaptation algorithm (21) that enables to directly evalutate this angle $\phi_k$.

The algorithm tracks angle $\theta_k' + \pi/4$; it performs two tasks simultaneously: tracking of the channel phase shift and transfer of data onto the axes. The system may be simplified according to the single-wire schematic of FIG. 12.

In this system, corresponding to $\xi = +\mu/4$, echo suppression is accomplished after phase setting. The observed signal $y_k$ is transformed by $\phi_k$ rotation into a signal:

$$\overline{y}_k = y_k \exp(i\phi_k).$$

The "clean" rotated signal, obtained after echo suppression is computed in another way by the formula:

$$\overline{e}_k = \overline{y}_k - \vec{\overline{C}}_k T\overline{a}_k$$

wherein estimated echo vector $\vec{\overline{C}}_k$ tracks the real rotated echo vector $\vec{C}_o$ expi $(\theta_k' + \pi/4)$ and not the echo $\vec{C}_o$ path itself. The remote data transmission channel phase shift, increased of $\pi/4$ is taken into account in the echo suppressor.

The phase correction adaptive algorithm is used by a loop including element 22 that determines $\phi_k$ from the two components of the received complex signal $\overline{e}_k$ and a complex multiplier 24. The multiplier also receives:

the signal $y_k$ coming from the line (that may include noise $n_k$) and signal $\exp(i\phi_k)$ supplied by element 22.

Multiplier 24 output signal $\bar{y}_k$ is next processed in the echo suppressor, of general conventional configuration, but for installation of algorithm SIGNIF of SIGNID.

Element 22 determining $\phi_k$ may for example be configured as in FIG. 14, where the elements similar to those of FIG. 12 have the same reference number.

Element 22 includes two channels respectively processing the real component $\tilde{e}_k{}^r$ and the imaginary component $\tilde{e}_k{}^i$ of $e_k$. Each channel includes an element 30a or 30b providing the absolute value to a comparator and switching circuit 32. Circuit 32 determines which of input values is the largest and accordingly enables either adaptation channel. Each adaptation channel includes a threshold circuit 34a or 34b (followed by inverter 36 in channel corresponding to $\tilde{e}_k{}^r$) and a multiplier 38a or 38b. Those multipliers are connected in order to respectively output $\tilde{e}_k{}^r$ with the sign of $\tilde{e}_k{}^i$ $\tilde{e}_k{}^i$ with the sign of $\tilde{e}_k{}^r$ The result retained by virtue of validation in switching circuit 32 is multiplied by parameter $\gamma$ in a programmable multiplier 40. The product, for example $\tilde{e}_k{}^r$· (sign of $\tilde{e}_k{}^i$) is added, in adder 42, to the previous value of $\phi_k$, stored in memory 44. A conventional circuit 46 is used to generate exp (i $\phi_k$) from successive values of $\phi_k$ in order to sent it to multiplier 22.

The system adaptation processus is similar to conventional echo suppressor's, with a possible learning phase. It is also possible to initially implement algorithm SI, with a fastest convergence, when the data have not reached yet the axes, and to complete the echo suppression by means of SIGNIF.

To summarize, the projection principle enables to reduce considerable the echo residue, in a simple way. The effectiveness of the principle is based on the particular fact that the complex data signal has one of its components—real or imaginary—null so that on the corresponding axis, the signal does not interfere with the echo suppressor adaptation. And that the elements necessary to fulfill this condition do not increase the complexity of the system, since they take the place of required receiving components.

Generally speaking, the projection principle garantees the convergence in the case where the error sign is considered.

For a 16 points graph, the acquisition of all points garantees a fast convergence, but is not a requirement. With less complexity, SIGNIF always provides satisfactory results.

We claim:

1. In a OAM or phase modulation data transmission system for transmission of local data $a_k$ from a local station to a remote station over a transmission medium exhibiting an echo and simultaneous transmission of far end data $d_k$ over said medium from said remote station, whereby said local station receives a far end data signal $y_k$ including said far end data $d_k$ and said echo,
   an adaptative echo suppressor located at said local station and comprising:
   an adaptive digital filter connected to receive the local data $a_k$ and a clean signal $e_k$ derived from the far end data signal and substantially free of said echo and arranged to deliver on an output an estimation $\sigma_k$ of the actual echo of the local data by multiplying a vector of coefficients $C_k$ with the local data $a_k$, said vector having an adaptation algorithm:

$$\vec{C}_{k+1} = \vec{C}_k + \mu \vec{a}_k{}^* \cdot f(e_k)$$

wherein $\mu$ is a predetermined incrementation step, $a_k{}^*$ is a conjugated value of the local data $a_k$ and f is a predetermined function of $e_k$, and
   subtractor means having an input connected to receive said far end data signal $y_k$ from said transmission medium and a subtractive input connected to receive said estimation $\sigma_k$ from said digital filter,
   wherein said digital filter is provided with means for rendering it only responsive to a vectorial component of $e_k$ which is orthogonal to the far end data.

2. Echo suppressor according to claim 1, wherein the function f uses the sign of said vectorial component of $e_k$ which is orthogonal to the far end data signal.

3. In a QAM or phase modulation data transmission system for transmission of local data from a local station to a remote station over a transmission medium exhibiting an echo and simultaneous transmission of far end data signal $y_k$ including said far end data $d_k$ and said echo, said far end data being distributed between points having different phases among a finite plurality of predetermined phases specific to the modulation,
   an adaptive echo suppressor located at said local station and comprising:
   an adaptive digital filter connected to receive the local data $a_k$ and a phase shifted clean signal $\tilde{e}_k$ derived from the far end data signal and substantially free of said echo and arranged to deliver on an output an estimation $\sigma_k$ of the actual echo of the local data by multiplying a vector of coefficients $\vec{C}_k$ with the local data $a_k$, said vector having an adaptation algorithm:

$$\vec{C}_{k+1} = \vec{C}_k + \mu a_k{}^* \cdot f(\tilde{e}_k)$$

wherein $\mu$ is a predetermined incrementation step, $a_k{}^*$ is a conjugated value of the local data $a_k$ and f is a predetermined function of $\tilde{e}_k$,
   subtractor means having an input connected to receive said far end data signal $y_k$ from said transmisson medium and a subtractive input connected to receive said estimation $\sigma_k$ from said digital filter, and
   adaptive phase correction means connected in series between the transmission medium and said subtractor and arranged for phase shifting all complex far end data $d_k$ by the same angle $\phi_k$ which is selected so that all those of the far end data $d_k$ which have at least one of said predetermined phases are rendered either (i) purely real, or (ii) purely imaginary and devoid of real component, before those data are applied to the subtractor means, said same angle $\phi_k$ being the sum of a predetermined angle $\lambda$ related to said one of the predetermined phases and not greater than $\pi/4$ and of a slowly variable phase shift $\theta$ introduced by the transmission medium.

4. Echo suppressor according to claim 3, characterized in that, for data brought back along axes, the function f is the sign of $\tilde{e}_k$.

5. Echo suppressor according to claim 3, wherein the phase correction means includes a first order digital phaselock loop, placed between the output of said subtractor means and a multiplier receiving data coming from said transmission medium.

6. In a OAM or phase modulation data transmission system for transmission of local data $a_k$ from a local station to a remote station over a transmission medium exhibiting an echo and simultaneous transmission of far end data $d_k$ over said medium from said remote station, whereby said local station receives a far end data signal $y_k$ including said far end data $d_k$ and said echo, an adaptive echo suppressor located at said local station and comprising:

an adaptive digital filter connected to receive the local data $a_k$ and a phase-shifted clean signal $\tilde{e}_k$ derived from the far end data signal and substantially free of said echo and arranged to deliver on an output an estimation $\sigma_k$ of the actual echo of the local data by multiplying a vector of coefficients $\vec{C}_k$ with the local data $a_k$, said vector having an adaptation algorithm:

$$\vec{C}_{k+1} = \vec{C}_k + \mu a_k^* f(\tilde{e}_k)$$

wherein $\mu$ is a predetermined incrementation step, $a_k^*$ is a conjugated value of the local data $a_k$ and f is a predetermined function of $\tilde{e}_k$, subtractor mans having an input connected to receive said far end data signal $y_k$ from said transmission medium and a subtractive input connected to receive said estimation $\sigma_k$ from said digital filter, and adaptive phase correction means connected in series between the transmission medium and said subtractor and arranged for phase shifting all complex far end data $d_k$ by the same angle $\phi_k$ which is selected so that at least some of the far end data $d_k$ are rendered either (i) purely real, or (ii) purely imaginary and entirely devoid of a real component, before the data are applied to the subtractor means, said same angle $\phi_k$ being the sum of a predetermined angle $\xi$ characteristic of the nature of the far end data and not greater than $\pi/4$, and of a slowly variable phase shift $\theta$ introduced by the transmission medium, wherein the adaptive phase correction means includes a first order digital phase-lock loop, connected between the output of said subtractor and a multiplier receiving data coming from said transmission medium, said loop including further means for determining said same angle phase shift from the real and the imaginary components of the complex signal delivered at an output of said subtractor means, said further means operating according to the algorithm:

$$\phi_{k+1} = \phi_k + \gamma f_1(\Psi_k)$$

wherein $\phi_k$ is said same angle of phase shift, $\gamma$ is a positive adaptation parameter, $f_1$ is a predetermined function and $\Psi_k$ is an angle, formed by (i) $\tilde{e}_k$ and (ii) one of an imaginary axis and a real axis, selected to be the smaller angle necessary to render at least some of the far end data purely real or purely imaginary.

7. Echo suppressor according to claim 6, characterized in that $f_1$ is proportional to $\Psi_k$.

8. Echo suppressor according to claim 7, characterized in that $\gamma$ has a value inversely proportional to $\sqrt{S}$, S being the power of far end data.

9. In a QAM or phase modulation data transmission system for transmission of local data $a_k$ from a local station to a remote station over transmission medium exhibiting an echo and simultaneous transmission of far end data $d_k$ over said medium from said remote station, whereby said local station receives a far end data signal $y_k$ including said far end data $d_k$ and said echo, said far end data being distributed between points having different phases among a finite plurality of predetermined phases specific to the modulation, an adaptive echo suppressor located at said local station and conprising:

an adaptive digital filter connected to receive the local data $a_k$ and a phase-shifted clean signal $\tilde{e}_k$ derived from the far end data signal and substantially free of said echo and arranged to deliver an an output an estimation $\sigma_k$ of the actual echo of the local data by multiplying a vector of coefficients $\vec{C}_k$ with the local data $a_k$, said vector having an adaptation algorithm:

$$\vec{C}_{k+1} = \vec{C}_k + \mu a_k^* f(\tilde{e}_k)$$

wherein $\mu$ is a predetermined incrementation step, $a_k^*$ is a conjugated value of the local data $a_k$ and f is a predetermined function of $e_k$, subtractor means having an input connected to receive said far end data signal $y_k$ from said transmission medium and a subtractive input connected to receive said estimation $\sigma_k$ from said digital filter, and phase correction means having: a multiplier connected in series relation between the transmission medium and said subtractor, having a first input connected to receive the far end data signal from said transmission medium, a second input connected to receive a signal representing an angle of phase shift and an output connected to said subtractor means; and phase lock loop means having an input connected to receive the output of said subtractor and an output connected to deliver said signal representing said angle of phase shift to said multiplier, said phase lock loop means being so arranged that said angle of phase shift is such as to render all those far end data which have at least one phase of said plurality of predetermined phases either (i) purely real, or (ii) purely imaginary without a real component, before those data are applied to the subtractor means, said angle of phase shift being the sum of a predetermined angle $\xi$ related to said one of the predetermined phases and not greater than $\pi/4$ and of a slowly variable phase shift $\theta$ introduced by the transmission medium.

* * * * *

UNITED STATES PATENT AND TRADEMARK OFFICE
CERTIFICATE OF CORRECTION

PATENT NO. : 4,852,081

DATED : July 25, 1989

INVENTOR(S) : BONNET ET AL

It is certified that error appears in the above-identified patent and that said Letters Patent is hereby corrected as shown below:

Title page, item [75] should read as follows:

-- [75] Inventors: Madeleine A. Bonnet, Paris; Odile M. Macchi, Orsay, both of France Signed and Sealed this Sixteenth Day of October, 1990

*Attest:*

HARRY F. MANBECK, JR.

*Attesting Officer*      *Commissioner of Patents and Trademarks*